US008059645B2

(12) United States Patent
Croak et al.

(10) Patent No.: US 8,059,645 B2
(45) Date of Patent: *Nov. 15, 2011

(54) METHOD AND APPARATUS FOR PROVIDING E911 SERVICES VIA NETWORK ANNOUNCEMENTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/647,464

(22) Filed: Dec. 26, 2009

(65) Prior Publication Data

US 2010/0098062 A1    Apr. 22, 2010

Related U.S. Application Data (63) Continuation of application No. 11/364,939, filed on Feb. 28, 2006, now Pat. No. 7,664,106.

(51) Int. Cl.
*H04J 1/16* (2006.01)
*H04L 12/56* (2006.01)
(52) U.S. Cl. .................. 370/389; 370/352; 370/401
(58) Field of Classification Search .................. 370/389, 370/352, 401
See application file for complete search history.

(56) References Cited

U.S. PATENT DOCUMENTS

| 6,707,888 | B1 * | 3/2004 | Cope .............................. 379/45 |
| 6,956,931 | B1 | 10/2005 | Cope |
| 6,963,557 | B2 | 11/2005 | Knox |
| 7,027,564 | B2 | 4/2006 | James |
| 7,200,207 | B2 | 4/2007 | Meer et al. |
| 7,564,838 | B2 | 7/2009 | McGary |
| 7,664,106 | B2 | 2/2010 | Croak et al. |
| 7,697,509 | B2 * | 4/2010 | Freitag et al. .................. 370/352 |
| 7,734,019 | B1 | 6/2010 | Terpstra |
| 2003/0156577 | A1 | 8/2003 | Dunlao et al. |
| 2004/0162052 | A1 | 8/2004 | Jang et al. |
| 2005/0063519 | A1 | 3/2005 | James |
| 2005/0190892 | A1 | 9/2005 | Dawson |
| 2006/0056388 | A1 | 3/2006 | Livingood |
| 2006/0072547 | A1 | 4/2006 | Florkey et al. |

(Continued)

FOREIGN PATENT DOCUMENTS

| EP | 1337089 A | 8/2003 |
| EP | 1589721 A | 10/2005 |
| WO | WO-2007-056186 | 5/2007 |

OTHER PUBLICATIONS

PCT Search Report and Written Opinion for PCT/US2007/005180; consists of 12 unnumbered pages. PCT Search Report and Written Opinion for PCT/US2007/005186; consists of 11 unnumbered pages.

*Primary Examiner* — John Pezzlo (57) ABSTRACT

A method and apparatus for providing emergency services, e.g., E911 services, for nomadic users by utilizing network announcements to remind customers to update location information used to provide services on packet networks, such as Voice over Internet Protocol (VoIP) and Service over Internet Protocol (SoIP) networks, are disclosed. For example, the method enables the VoIP or SoIP service provider to detect a change in the IP address associated with either the broadband modem or the router through which a terminal adaptor is used to access services when a customer is logging on from a new location. In turn, the method sends a reminder network announcement message to the terminal adaptor, e.g., to be played when the terminal adaptor goes off-hook.

20 Claims, 4 Drawing Sheets

U.S. PATENT DOCUMENTS

| | | |
|---|---|---|
| 2007/0104183 A1* | 5/2007 | Bakke et al. ............... 370/352 |
| 2007/0121803 A1 | 5/2007 | Koepke et al. |
| 2007/0189469 A1 | 8/2007 | Croak et al. |
| 2007/0201622 A1 | 8/2007 | Croak et al. |
| 2009/0264095 A1 | 10/2009 | Khetewat et al. |
| 2010/0098062 A1 | 4/2010 | Croak et al. |

* cited by examiner

METHOD AND APPARATUS FOR PROVIDING E911 SERVICES VIA NETWORK ANNOUNCEMENTS

This application is a continuation of U.S. patent application Ser. No. 11/364,939 filed Feb. 28, 2006 now U.S. Pat. No. 7,664,106, which is currently allowed and is incorporated herein by reference in its entirety.

The present invention relates generally to communication networks and, more particularly, to a method for providing E911 services to nomadic subscribers by utilizing network announcements to remind users to update location information used for accessing services on packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for both voice and data transport needs. One of the concerns customers have about relying on the IP based services for all data transport needs is that IP based services enable the customer to access services from any location with Internet access while using the same originating telephone number and device. Namely customers are provided with more flexible options and can obtain the same service regardless of whether the call originated from a home, a hotel, a dormitory, etc. However, calls to emergency service providers are delivered based on the physical location of the caller to the closest center equipped to provide the emergency service. For example, in North America, when a customer dials 911, the Public Switched Telephone Network (PSTN) determines the caller's telephone number, and provides the telephone number and location of the caller to the appropriate Public Safety Answering Point (PSAP).

When 911 calls originate in a packet network such as VoIP or SoIP networks, the VoIP or SoIP service provider needs to determine the telephone number and physical location of the caller so that the information is sent to the appropriate PSAP through the PSTN network. Typically, the service address is obtained from the customer when the service is activated. However, the nomadic customer can move a terminal adaptor to another physical location and forget to update the address provided to the service provider. Thus, services that rely on the physical location of the caller, e.g., E911 service, cannot continue to be supported appropriately without an updated address.

Therefore, there is a need for a method that enables a packet network service provider, e.g., a VoIP or SoIP service provider to remind the customer to update the location information.

SUMMARY OF THE INVENTION

In one embodiment, the present invention discloses a method and apparatus for providing emergency services, e.g., E911 services, for nomadic users by utilizing network announcements to remind customers to update their location information for receiving services on packet networks such as Voice over Internet Protocol (VoIP) and Service over Internet Protocol (SoIP) networks. For example, a nomadic customer attaches a terminal adaptor to either a broadband modem or a router in order to access services where they are located. The present method enables a VoIP or SoIP service provider to detect a change in an Internet Protocol (IP) address associated with either the broadband modem or the router, e.g., if the customer is accessing service from a different physical location from that of a service address that was previously recorded by the service provider. If such change is detected, the service provider will send a reminder network announcement message to the terminal adaptor.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing emergency services, e.g., E911 services, for nomadic users by utilizing network announcements to remind users to change their location information in an IP network such as a VoIP or SoIP network. Although the present invention is discussed below in the context of emergency calls in VoIP and SoIP networks, the present invention is not so limited. Namely, the present invention can be applied for other networks with mobile customers.

Figure 1:
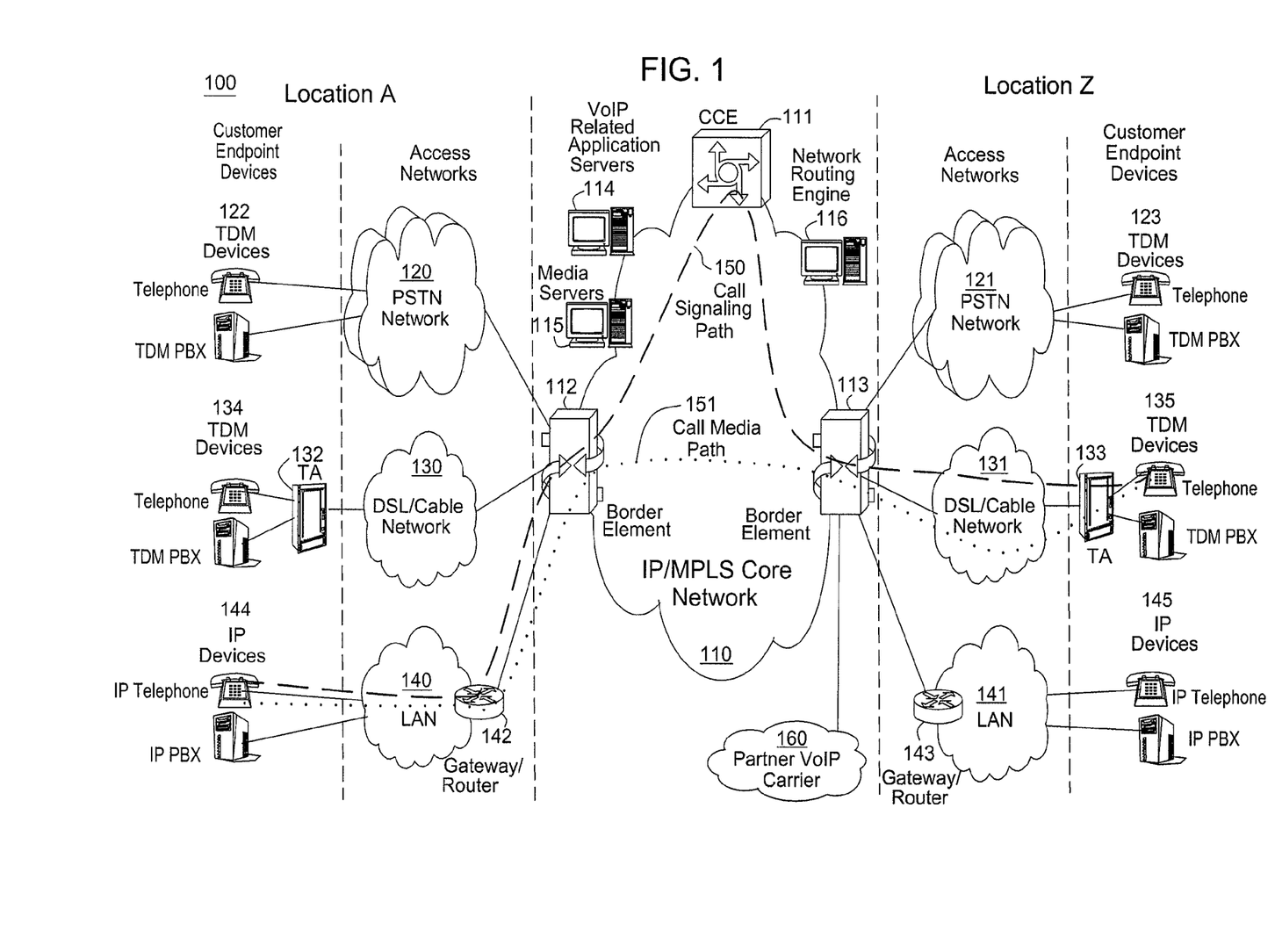
FIG. 1 illustrates an exemplary network related to the present invention.

To better understand the present invention, FIG. 1 illustrates an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported on networks such as VoIP and SoIP networks. Internet services such as VoIP and SoIP services are becoming ubiquitous and more and more businesses and consumers are relying on their Internet connections for both voice and data transport needs. One of the concerns customers have about relying on the IP based services for all services is the fact that emergency calls that require Public Safety Answering Point (PSAP) are provided on a traditional Public Switched Telephone Network (PSTN).

For example, in North America 911 calls are provided through the Public Switched Telephone Network. The calls are delivered based on the geographical location of the caller to the closest PSAP. The 911 calls from packet network users, such as VoIP and SoIP customers, may traverse other networks prior to being terminated but are eventually sent to the public safety answering point in the PSTN network. When customers receive all services from the VoIP or SoIP service provider, the VoIP or SoIP service provider identifies the caller, the caller's physical location, and provides the information to a 911 tandem. The 911 tandem is located in the PSTN network. The local exchange carrier with the PSTN network delivers the information from the 911 tandem to the PSAP. Thus, the call request, the telephone number and the caller's address flow from the VoIP or SoIP service provider towards the public safety answering point. The service address is typically obtained from the customer when the service is activated. However, the nomadic customer can move the terminal adaptor to another physical location and forget to update the address provided to the service provider.

Services that rely on the physical location of the caller, e.g. E911, cannot continue to be supported appropriately without an updated address. Therefore there is a need for a method that enables the VoIP or SoIP service provider to remind the customer to update the location information when the customer moves the terminal adaptor and begins accessing services from a new location.

The current invention discloses a method and apparatus for providing E911 services for nomadic users by sending reminder network announcements to the users to update the location information. In one embodiment, the VoIP or SoIP service provider enables the users to subscribe to an E911 service for dialing 911 and having the call completed at the appropriate Public Safety Answering Point (PSAP). For example, when a customer accesses the VoIP or SoIP service from a new physical location with the original telephone number and device, the customer moves the terminal adaptor to the new location and attaches it to another broadband modem or router. The broadband modem used to access the Internet will likely remain stationary. In one embodiment, the present invention provides a method for detecting when a customer is logging on from a new location, for invoking a network process to send a reminder network announcement to the user's telephone adaptor, for playing the network announcement when the telephone adaptor is off-hook, and for deactivating the network announcements once the updated information is received and validated by downstream databases e.g., a database used for E911 services.

In order to clearly illustrate the teachings of the current invention, the following terminologies and networking concepts will first be described:

911 call;
911 tandem;
Public Safety Answering Point (PSAP);
Automatic Location Identification (ALI);
Automatic Number Identification (ANI); and
Enhanced 911 (E911).
A router;
A cable modem; and
A DSL modem;

A 911 call refers to a telephone call placed for the purpose of reaching emergency services. The public switched telephone network has been enabled to recognize specific telephone numbers as a call for emergency services. For example, the current telephone number used in North America is 911. The emergency call is delivered based on geographical location of the caller to a public safety answering point as defined below. The location of the caller is associated with a public safety answering point and the call is routed accordingly.

A 911 tandem refers to a switch used to connect telephone switching centers to the various public safety answering points. For example, when a wireless caller dials 911, the call is routed to a mobile switching center. The mobile switching center is connected to the 911 tandem that determines the appropriate public safety answering point and routes the call. The Incumbent Local Exchange Carrier (ILEC) typically manages the telephone equipment such as the 911 tandem that routes the call to the appropriate public safety answering point.

Public Safety Answering Point (PSAP) refers to a location where emergency calls are received and distributed to the appropriate emergency services such as the fire department, ambulance service, police dispatch locations, etc. The services that belong in a particular PSAP vary by community. For example, some communities may include flood, power outage etc. as emergency while other communities may consider those services as non-emergency.

Automatic Location Identification (ALI) refers to a technology used to determine the geographical location of the source of emergency calls. The location of the caller can be determined by various methods such as providing the users with devices that have capabilities to report locations. For example, the service providers can place Global Positioning Systems (GPS) in the phones and obtain the physical location information from the GPS receivers. In another example, if the location of the device does not change often, the caller may provide the location of the device being used to the service provider when the service is activated and update it as necessary.

Automatic Number Identification (ANI) refers to a technology used to determine the callback number of the source of emergency calls. In turn, the 911 tandem can read the ANI information and provide it to the PSAP.

Enhanced 911 (E911) refers to an enhancement of technology required by the Federal Communications Commission (FCC) to enable mobile devices such as cellular phones to process 911 calls, and enable the public safety answering point to determine the ANI and the ALI. If the call is disconnected, the ANI is used to callback the user. The ALI is used to determine the physical location of the caller. Hence, the ANI and ALI are used to facilitate emergency services even in cases where the caller may not be able to communicate or provide location information. For example, if the caller is a child, the ALI and ANI may be the only way to dispatch emergency service providers to the location.

A router is a networking device used to forward packets towards their destination using the Layer-3 networking protocol such as IP. In a home or small office environment, it can be used to handle the sharing of an Internet connection. Thus, the router may have address translation capability to allow multiple computers to access the Internet using a single public IP address. The router in this environment may contain firewall, Ethernet hub and wireless hub functions. When analog phones are used to access VoIP services, the router may also include RJ-11 ports for connecting with the TA. Hence, the router has a variety of ports such as Ethernet, RJ-11, wireless etc. to enable sharing the network connection and a port for connecting to either the DSL or Cable broadband network.

A cable modem is a device used to access the information contained on a plurality of channels transmitted on a coaxial cable. A cable modem contains at least a tuner for selection of frequencies, a demodulator for converting the radio frequency signals to signals that vary with voltage, an analog to digital converter, a Media Access Control (MAC) and a processor. If it is used for Internet access it also contains a digital to analog converter and a modulator. When a home network is connected to the cable network through the router, different channels are used for the CATV and Internet services such as VoIP. For example, the cable modem separates the channels for the Internet services and the CATV. The packets on the channels for Internet services are forwarded to the router. If only one computer is connected to the Internet, the computer can be directly connected to the cable modem without the router.

A Digital Subscriber Line (DSL) modem is a device with modulation scheme used to connect data devices such as a computer for transporting packets on a telephone network. DSL uses existing phone lines to connect to the Internet.

A broadband service can be provided on DSL or cable. The appropriate modems are utilized based on the type of broadband access and the customer's network such as the home or office network that is connected to either the telephone or coaxial cable network. In order to originate a call using an analog device, the analog device is attached to a terminal adaptor that is in turn connected to either the router or directly to the broadband modem. The modem used for broadband access (DSL or cable) will likely remain stationary. When a VoIP or SoIP customer moves from a physical location to another, and wishes to continue accessing services, the customer moves the terminal adaptor to the new location. Therefore, the terminal adaptor is attached to another router or broadband modem at the new location. The present invention provides a method for detecting the change in the IP address and obtaining the new address information from the nomadic customer such that E911 services can be delivered appropriately.

Figure 2:
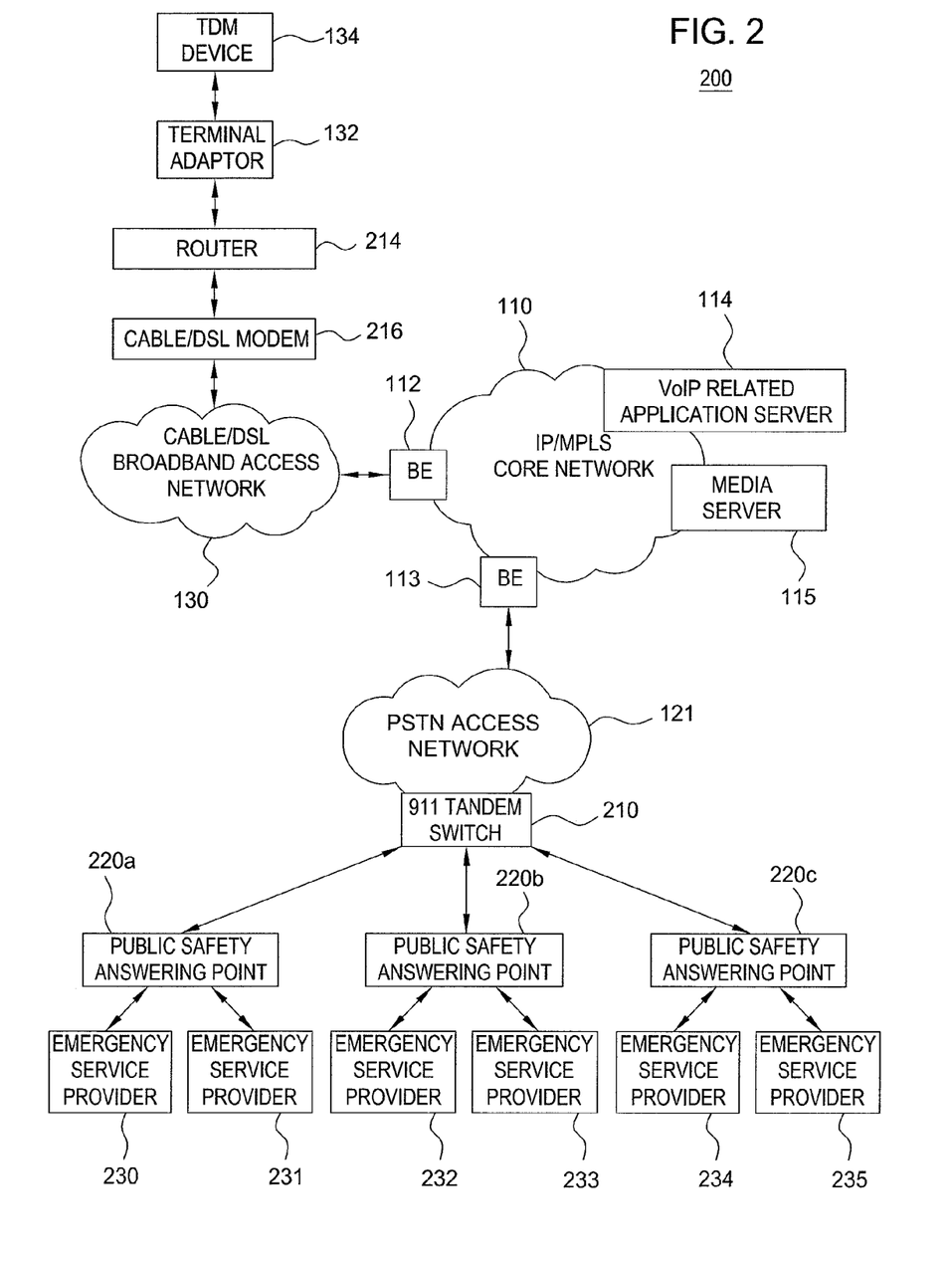
FIG. 2 illustrates an exemplary network with one embodiment of the invention for providing E911 services for nomadic users via network announcements.

FIG. 2 illustrates an exemplary network 200 with one embodiment of the present invention for providing E911 services via network announcements. For example, a customer may use a TDM device 134 to originate calls. The TDM device 134 is connected to a terminal adaptor 132 and the terminal adaptor 132 is connected to a broadband cable or DSL modem 216 through a router 214. The broadband modem 216 is connected to a broadband DSL or cable access network 130. It should be noted that in one embodiment, the terminal adaptor can be directly connected to the broadband modem without the router.

In one embodiment, the packets transmitted by the TDM device 134 traverse the access network 130 and reach an IP/MPLS core network 110 through a border element 112. The packets then traverse the core network 110 from border element 112 to a border element 113. Border element 113 is connected to a PSTN access network 121. The PSTN network routes the 911 calls to a 911 tandem switch 210. In one embodiment, the 911-tandem switch is connected to a plurality of Public Safety Answering Points (PSAP) 220a, 220b and 220c. The 911 tandem switch forwards a 911 call to the closest public safety answering point based on the physical location of the caller. The public safety answering points 220a, 220b and 220c are connected to a plurality of emergency service providers 230, 231, 232, 233, 234 and 235. The community determines the emergency services such as the local police department, ambulance service, etc. to be connected to the PSAP.

In one embodiment, the service provider may utilize a VoIP application server 114 located in the IP/MPLS core network 110 for providing services to the nomadic users. Specifically, the application server 114 (e.g., deploying a network agent application) is capable of detecting changes in the IP addresses, e.g., the sub network IP addresses of TAs. In turn, the application server 114 is connected to a media server 115 for playing network announcements, etc. It should be noted that a sub network IP address of a TA is broadly defined to encompass an IP address of the TA, an IP address of a modem that is used in conjunction with the TA, and/or an IP address of a router that is used in conjunction with the TA. Namely, the sub network IP address of a TA is a function as to how the network is configured.

Figure 3:
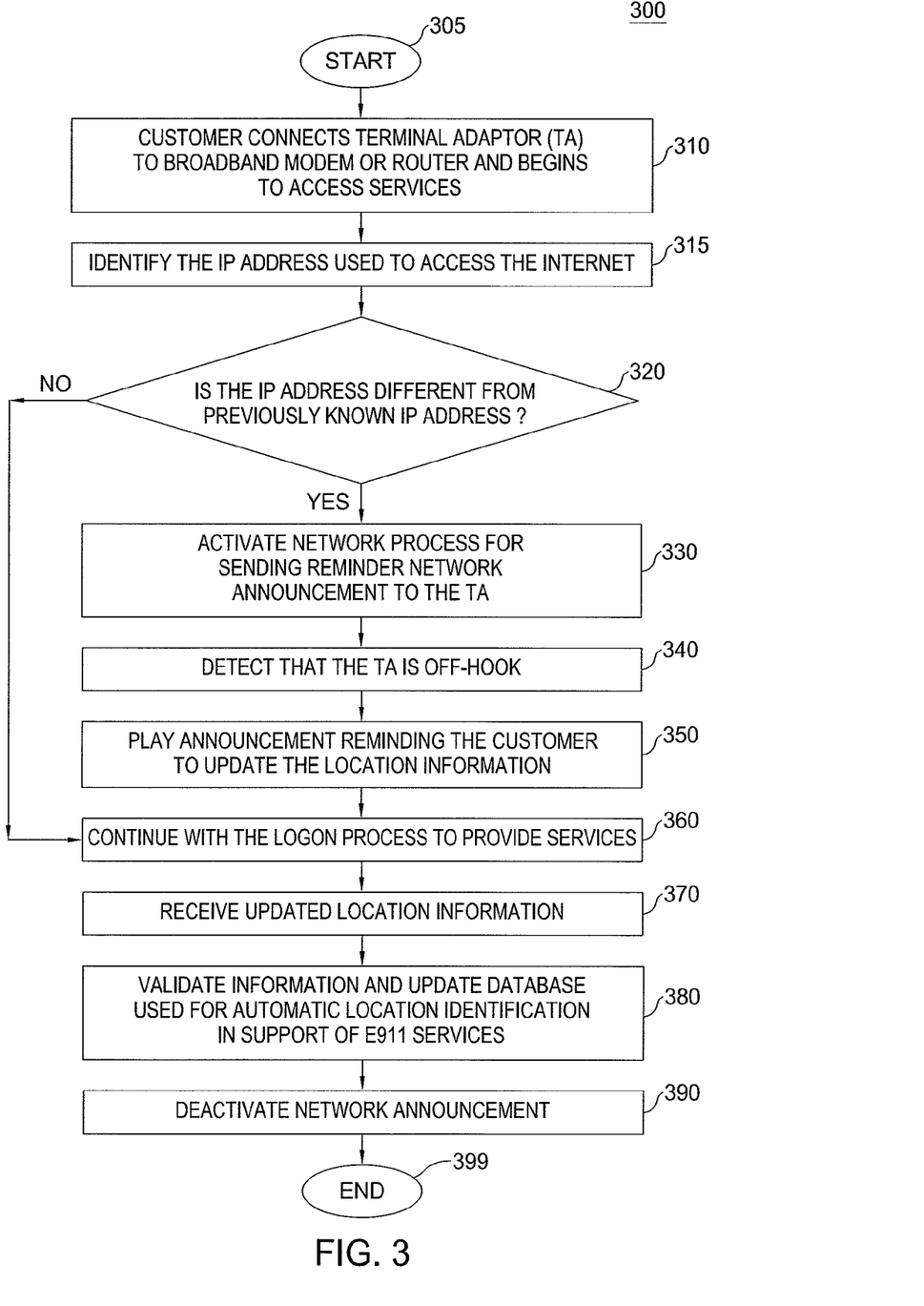
FIG. 3 illustrates a flowchart of the method for providing E911 services for nomadic users via network announcements.

FIG. 3 illustrates a flowchart of the method 300 for providing E911 services for nomadic users via network announcements. For example, the method also enables the VoIP or SoIP service provider to discover when the IP address of the broadband modem or router used to access the Internet is changed.

Method 300 starts in step 305 and proceeds to step 310. In step 310, a customer connects the terminal adaptor to a router or a broadband modem and begins to access services. For example, the customer moves the terminal adaptor from a previous location to a new location and connects the terminal adaptor to the devices being used for Internet access at the new location.

In step 315, method 300 determines a sub network IP address of the TA, e.g., the IP address associated with the router or broadband modem being used to access the Internet and services. In one embodiment, a router is used to handle the sharing of the Internet connection. The router's address translation capability may allow multiple computers and analog devices to access the Internet using a single public IP address. When analog phones are used to access VoIP services, the devices are connected to the terminal adaptor. The terminal adaptor is then connected to the RJ-11 ports on the router. In another embodiment, the terminal adaptor is connected to the broadband modem to access the Internet without a router. In both cases, all devices sharing the Internet connection through the broadband modem share the IP address. The method 300 is capable of reading the IP address used to access the services and proceeds to step 320.

In step 320, method 300 determines whether the IP address is different from the IP address used previously by the customer in accessing services. For example, the method compares the received IP address to a previously known IP address. If the customer moved the terminal adaptor to another location, the IP address will be different from the previous session. If the IP address is different, the method proceeds to step 330 to activate a network process for sending network announcement. Otherwise, no change in the address location is needed and the method proceeds to step 360 to continue with the logon process and to provide the VoIP or SoIP services to the customer as requested.

In step 330, method 300 activates a network process for sending a network announcement reminding the customer to change the location information provided to the VoIP or SoIP service provider. For example, the application server sends a request to the media server to play a network announcement when the customer's terminal adaptor becomes off-hook. The VoIP or SoIP service provider determines the content and detail level of the announcement such as "please access the service web site and update your location", "please call customer service and update your location information", or "please send change of address to the service provider", etc. The method then proceeds to step 340 to detect when the terminal adaptor is off-hook.

In step 340, method 300 determines when the terminal adaptor is off-hook. For example, when the customer picks up the terminal adaptor to originate or receive a call, the service provider will be able to detect that the terminal adaptor is off-hook.

In step 350, method 300 plays a network announcement reminding the customer to update the location information. In one embodiment, the service provider utilizes a media server for playing the announcement. In another embodiment, the service provider may enable the VoIP or SoIP application server to send the announcement to the telephone adaptor and have the telephone adaptor play the announcement when it becomes off-hook. The method then proceeds to step 360 to continue providing services to the customer.

In step 360, method 300 continues with the logon process and provides the VoIP or SoIP services requested by the customer. For example, if the customer was originating a call when the network announcement was played, the customer proceeds with origination of the call.

In step 370, method 300 receives the updated location information from the customer. For example, if the customer is in a hotel, the customer may call the customer service and provide the street address, room number, etc. Alternatively, the customer may provide the updated information by utilizing a web site, or by calling a customer service agent, etc.

In step 380, method 300 validates the received location information and updates the databases used for emergency services, e.g., E911 services. For example, if the nomadic customer is now located in a location served by a different Public Safety Answering Point (PSAP), the database used for determining the appropriate PSAP is updated. Validation may comprise verifying that the address received from the customer is a valid address. The service provider is then ready to process E911 calls for the nomadic customer at the new location.

In step 390, method 300 deactivates the network announcement. For example, if the network announcement was being played each time the customer picked up the terminal adaptor to originate or receive a call, the network announcement is deactivated such that it will no longer be played. The method then proceeds to step 399. Method 300 ends in step 399.

It should be noted that steps 370-390 are only performed for customers who have changed their locations. Namely, steps 370-390 will not be performed for a customer who has not changed his or her location.

Figure 4:
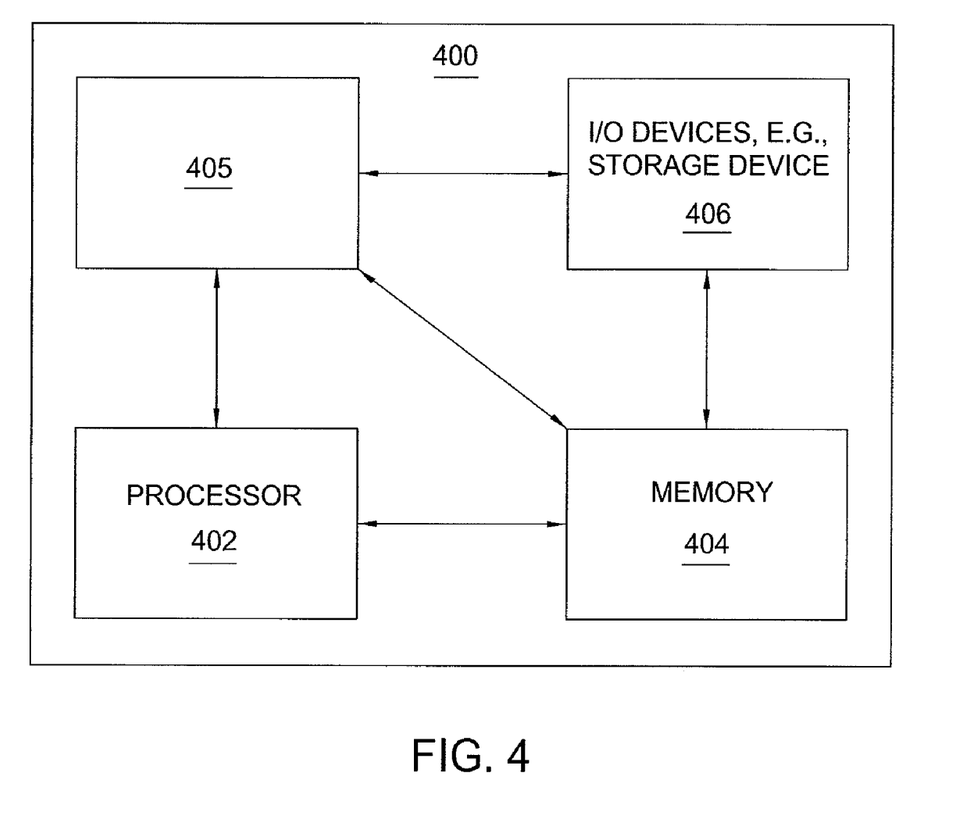
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing E911 services for nomadic users via network announcements, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing E911 services for nomadic users via network announcements can be loaded into memory 404 and executed by processor 402 to implement the functions as discussed above. As such, the present method 405 for providing E911 services for nomadic users via network announcements (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a service in a communication network, comprising:
receiving a request from a customer for accessing a non-emergency service, wherein the non-emergency service is any service other than an emergency service;
detecting a change in an internet protocol address associated with the customer; and
sending a reminder network announcement to the customer to provide an update relating to location information of the customer.

2. The method of claim 1, wherein the communication network is an internet protocol network.

3. The method of claim 1, wherein the service comprises an internet protocol service.

4. The method of claim 1, wherein the internet protocol address relates to a sub network internet protocol address of a terminal adaptor.

5. The method of claim 4, wherein the sending further comprises:
determining if the terminal adaptor is off-hook; and
playing the reminder network announcement if the terminal adaptor is off-hook.

6. The method of claim 4, wherein the sub network internet protocol address of the terminal adaptor comprises an internet protocol address of a router.

7. The method of claim 6, wherein the sub network internet protocol address of the terminal adaptor comprises an internet protocol address of a modem.

8. The method of claim 7, wherein the modem comprises a broadband access modem.

9. The method of claim 1, wherein the emergency service is an E911 service.

10. The method of claim 1, further comprising:
receiving the update relating to the location information from the customer.

11. The method of claim 10, further comprising:
validating the update relating to the location information received from the customer.

12. The method of claim 10, further comprising:
deactivating the reminder network announcement when the update relating to the location information is received from the customer.

13. A non-transitory computer-readable medium having stored thereon a plurality of instructions, the plurality of instructions including instructions which, when executed by a processor, cause the processor to perform a method for providing a service in a communication network, comprising:
receiving a request from a customer for accessing a non-emergency service, wherein the non-emergency service is any service other than an emergency service;
detecting a change in an internet protocol address associated with the customer; and
sending a reminder network announcement to the customer to provide an update relating to location information of the customer.

14. The non-transitory computer-readable medium of claim 13, wherein the communication network is an internet protocol network.

15. The non-transitory computer-readable medium of claim 13, wherein the internet protocol address relates to a sub network internet protocol address of a terminal adaptor.

16. The non-transitory computer-readable medium of claim 15, wherein the sending further comprises:
determining if the terminal adaptor is off-hook; and
playing the reminder network announcement if the terminal adaptor is off-hook.

17. The non-transitory computer-readable medium of claim 15, wherein the sub network internet protocol address of the terminal adaptor comprises an internet protocol address of a router.

18. The non-transitory computer-readable medium of claim 17, wherein the sub network internet protocol address of the terminal adaptor comprises an internet protocol address of a modem.

19. The non-transitory computer-readable medium of claim 13, wherein the emergency service is an E911 service.

20. An apparatus for providing a service in a communication network, comprising:
- a processor configured to:
  - receive a request from a customer for accessing a non-emergency service, wherein the non-emergency service is any service other than an emergency service;
  - detect a change in internet protocol address associated with the customer; and
  - send a reminder network announcement to said the customer to provide an update relating to location information of the customer.

* * * * *